United States Patent
Skoog et al.

(10) Patent No.: US 8,886,445 B1
(45) Date of Patent: Nov. 11, 2014

(54) AUTOMATIC AIRCRAFT COLLISION AVOIDANCE SYSTEM AND METHOD

(75) Inventors: Mark Skoog, Palmdale, CA (US); Loyd Hook, Valencia, CA (US); Shaun McWherter, Lancaster, CA (US); Jaimie Willhite, California City, CA (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 977 days.

(21) Appl. No.: 12/718,034

(22) Filed: Mar. 5, 2010

(51) Int. Cl.
*G06F 19/00* (2011.01)
*G09G 5/00* (2006.01)

(52) U.S. Cl.
USPC ............................ 701/120; 345/606

(58) Field of Classification Search
CPC ......... G01S 19/15; G01S 1/047; G06T 17/20; G06T 15/00; G06T 3/403; G06T 3/4092; G08G 5/025; G06K 9/52; G09G 2340/02
See application file for complete search history.

(56) References Cited

U.S. PATENT DOCUMENTS

| | | | | |
|---|---|---|---|---|
| 4,890,249 A | | 12/1989 | Yen | |
| 5,740,047 A | * | 4/1998 | Pilley et al. | 701/120 |
| 5,974,423 A | * | 10/1999 | Margolin | 345/606 |
| 6,057,849 A | * | 5/2000 | Haubner et al. | 345/428 |
| 6,182,005 B1 | * | 1/2001 | Pilley et al. | 701/120 |
| 6,195,609 B1 | * | 2/2001 | Pilley et al. | 701/120 |
| 6,314,370 B1 | * | 11/2001 | Curtright | 701/412 |
| 6,748,323 B2 | * | 6/2004 | Lokshin et al. | 701/487 |
| 2002/0113719 A1 | * | 8/2002 | Muller et al. | 340/961 |
| 2002/0118224 A1 | * | 8/2002 | Levanon et al. | 345/748 |
| 2005/0128197 A1 | * | 6/2005 | Thrun et al. | 345/421 |
| 2007/0247350 A1 | | 10/2007 | Ryan | |
| 2008/0238941 A1 | * | 10/2008 | Kinnan et al. | 345/630 |

OTHER PUBLICATIONS http://www.terrametrics.com/viz.*

* cited by examiner

*Primary Examiner* — Ryan Zeender
*Assistant Examiner* — Dana Amsdell

(57) ABSTRACT

The invention is a system and method of compressing a DTM to be used in an Auto-GCAS system using a semi-regular geometric compression algorithm. In general, the invention operates by first selecting the boundaries of the three dimensional map to be compressed and dividing the three dimensional map data into regular areas. Next, a type of free-edged, flat geometric surface is selected which will be used to approximate terrain data of the three dimensional map data. The flat geometric surface is used to approximate terrain data for each regular area. The approximations are checked to determine if they fall within selected tolerances. If the approximation for a specific regular area is within specified tolerance, the data is saved for that specific regular area. If the approximation for a specific area falls outside the specified tolerances, the regular area is divided and a flat geometric surface approximation is made for each of the divided areas. This process is recursively repeated until all of the regular areas are approximated by flat geometric surfaces. Finally, the compressed three dimensional map data is provided to the automatic ground collision system for an aircraft.

12 Claims, 3 Drawing Sheets

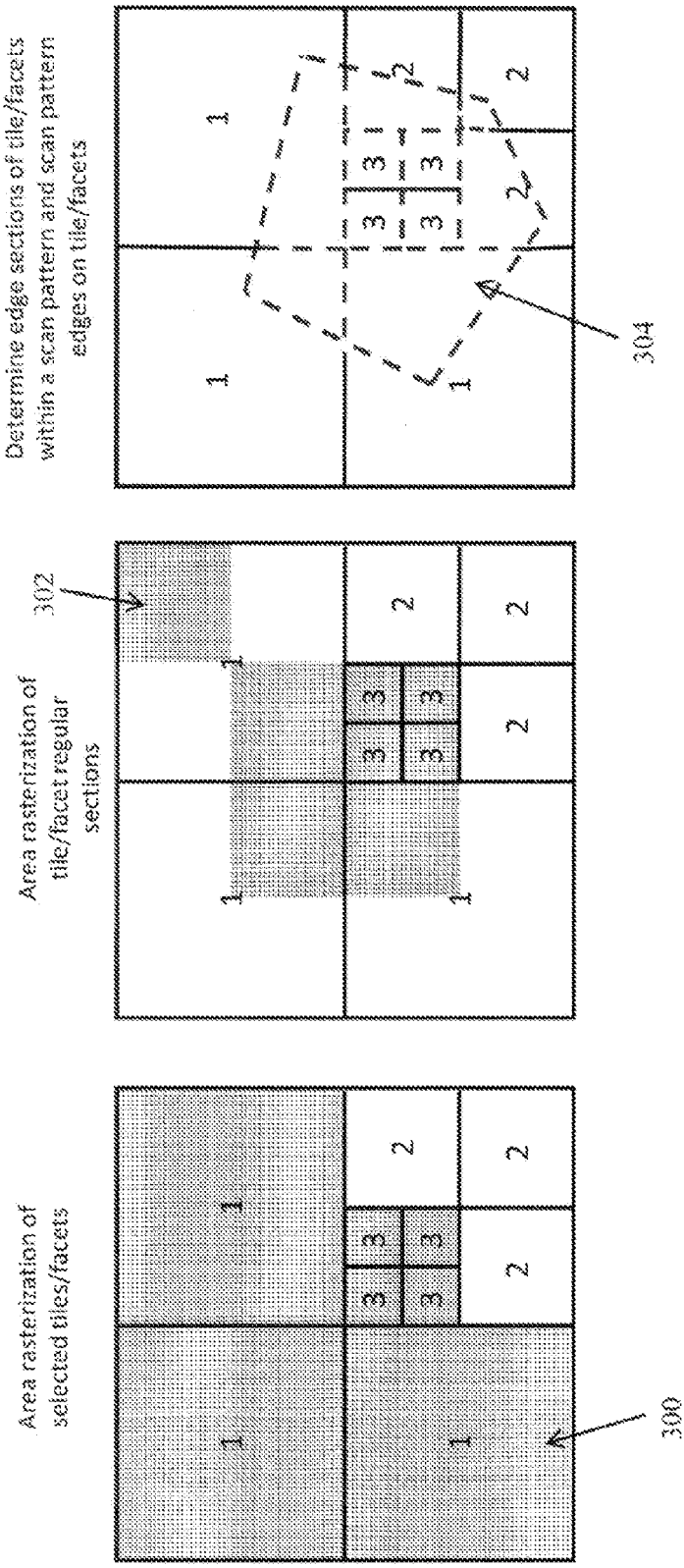

AUTOMATIC AIRCRAFT COLLISION AVOIDANCE SYSTEM AND METHOD

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

The present invention relates generally to aircraft collision avoidance, more specifically to aircraft ground collision avoidance, and most specifically to cross-platform automatic aircraft ground collision avoidance.

2. Description of the Related Art

The Office of the Secretary of Defense has required a reduction in the number of mishaps associated across defense aircraft platforms. Automatic Ground Collision Avoidance Systems (Auto-GCAS) have been tested on defense aircraft and have been demonstrated to reduce aircraft mishaps.

Auto-GCAS utilize digital terrain elevation data (DTED) to determine ground proximity. DTED is a product developed and maintained by the National Geospatial Intelligence Agency and is not produced to operate with Auto-GCAS. Therefore, Auto-GCAS requires manipulation and conditioning of DTED both prior to installing it in aircraft as well as in flight for proper operation of Auto-GCAS. The altered DTED is known as a digital terrain map (DTM).

However, due to the size of the DTM, many aircraft do not possess sufficient storage capacity and/or computing resources in their standard onboard systems in order to use the Auto-GCAS with the standard DTM.

One attempt to address this problem is disclosed in U.S. patent application 2007/0247350. The application discloses a method of reformatting terrain data to increase compressibility of the data. While this invention allows for significant compression of terrain data, it may not provide sufficient compression for certain aircraft. Further, this disclosure does not allow one to compress terrain data to different levels of compression. Also, the compressed data cannot be used in its compressed format.

Therefore, it is desired to provide a system and method to significantly compress a digital terrain map for use in an Auto-GCAS system, with the flexibility to compress the DTM to different levels of compression and to use the data in its compressed format.

SUMMARY OF THE INVENTION

The invention proposed herein comprises a system and method of compressing a DTM to be used in an Auto-GCAS system using a semi-regular geometric compression algorithm.

Accordingly, it is an object of this invention to provide a system and method for compressing a DTM to make Auto-GCAS systems available to numerous aircraft platforms.

It is a further object of this invention to provide a system and method for compressing a DTM to be used in an Auto-GCAS system to greatly decrease aircraft mishaps.

This invention meets these and other objectives related to improving ground collision avoidance for aircraft by providing a system and method for using three dimensional map data in an automatic ground collision avoidance system for an aircraft. In general, the invention operates by first selecting the boundaries of the three dimensional map to be compressed and dividing the three dimensional map data into regular areas. Next, a type of free-edged, flat geometric surface is selected which will be used to approximate terrain data of the three dimensional map data. The flat geometric surface is used to approximate terrain data for each regular area. The approximations are checked to determine if they fall within selected tolerances. If the approximation for a specific regular area is within specified tolerance, the data is saved for that to specific regular area. If the approximation for a specific area falls outside the specified tolerances, the regular area is divided and a flat geometric surface approximation is made for each of the divided areas. This process is recursively repeated until all of the regular areas are approximated by flat geometric surfaces. Finally, the compressed three dimensional map data is provided to the automatic ground collision system for an aircraft.

In a preferred embodiment, the invention also includes determining a specific regular area associated with a position area of interest and decoding the compressed data associated with the specific regular area to identify the geometric location of each flat geometric surface within a two-dimensional representation of the specific regular area. Finally, the decoded, data is used to output the height associated with the position area of interest to a display in the aircraft.

BRIEF DESCRIPTION OF THE DRAWINGS

In the drawings, which are not necessarily to scale, like or corresponding parts are denoted by like or corresponding reference numerals.

FIGS. 3A-3C depict geometric representations of a selected regular areas with a selected to position areas of interest represented.

DESCRIPTION OF PREFERRED EMBODIMENTS

Figure 1:
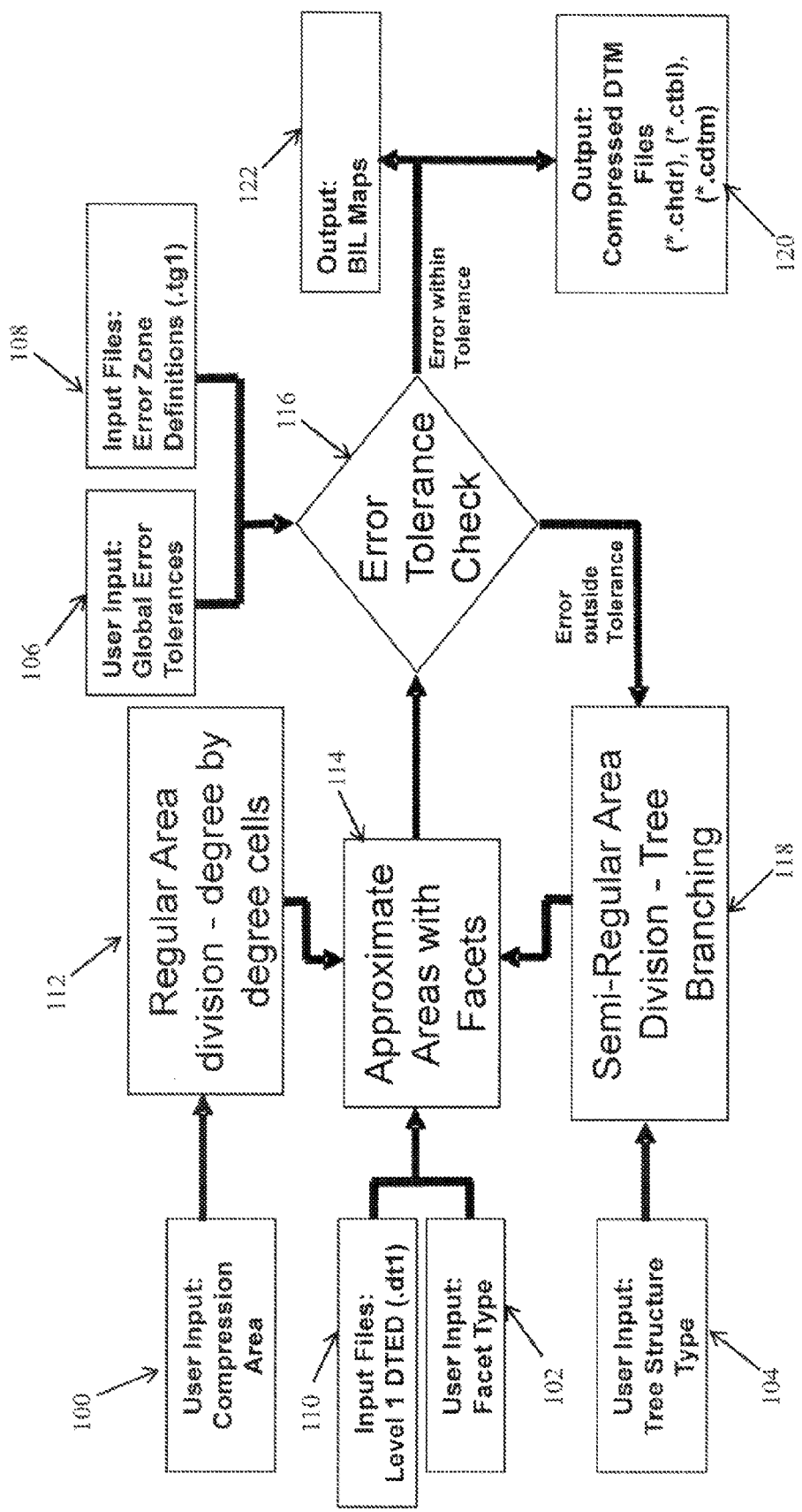
FIG. 1 depicts a top level block diagram of the compression process of the present invention.

A DTM is a three-dimensional computer model of the terrain of a given area. The National Geospatial-Intelligence Agency (NGA) creates, distributes and maintains DTMs for the DoD. DTED is a standard DTM data convention and is most commonly used in GCAS applications. The NGA creates, distributes and maintains a standardized DTED product for the DoD as well as other users.

DTED represents regularly spaced "posts" of elevation. The spacing or resolution of this data is referred to as the Level of the data. Most collision avoidance systems using DTED are based on Level 1 data. Level 1 data is primarily composed of 3 arc-second by 3 arc-second (latitude and longitude) spacing though most further thin this data to a more coarse resolution. As data approaches the higher latitudes, longitude spacing is increased to keep roughly a square spacing of the posts (roughly 300 feet by 300 feet). Level 2 data is spaced at 1 arc-second by 1 arc-second intervals (100 feet by 100 feet). Level 2 tends to be more accurate than Level 1 data, however the file size is nine time larger for the same area covered by Level 1 data.

The DTED is divided into file segments called cells. A DTED cell represents a one-degree by one-degree area of the earth (latitude and longitude). DTED is available for roughly 70-percent of the earth's landmass and coverage continues to increase over time.

Auto GCAS is a system that prevents controlled flight into terrain (CFIT). The system utilizes a high-authority autopilot to evade terrain when triggered by a predictive algorithm. The predictive algorithm is comprised of a trajectory prediction and a terrain prediction that feed a determination of the need to evade. The trajectory prediction is a fast-time simulation that estimates the future aircraft trajectory as if the autopilot were to be engaged at that instant and is continuously updated with aircraft state information. The terrain prediction utilizes DTED to determine ground proximity.

The trajectory prediction process can be further broken down into sub-functions. DTED cells are typically modified in some way to suit the aircraft application. This forms a DTM. All or some portion of the DTM is the loaded onto the aircraft in non-volatile memory (NVM). While in flight, the aircraft accesses the DTM to create a local map which is some area surrounding the current position of the aircraft. This data is loaded into random access memory (RAM). The local map is further simplified through a scanning function that selects terrain elevations ahead of the aircraft under and around the near-term potential evasion maneuvers. These terrain elevations are then further simplified to generate the predicted terrain profile that is sent to the "Determine Need to Evade" function.

For many aircraft, integration of an Auto-GCAS is not possible due to the size of the DTM, as provided by NGA. In order to enable integration of Auto-GCAS onto specific aircraft platforms, the DoD determined that a DTM which stores terrain information in a more space efficient manner must be generated. In addition to size requirements, for safety purposes, the Auto-GCAS system must also not activate at altitudes above the ground where vertically stacked formation flight may occur; floor levels must be low enough to fly standard missions; a three degree glide slope approach and takeoff down to 150 foot AGL to all airfields must be allowed; no special action must be taken by the maintainer or pilot during normal flight operations for Auto-GCAS to function properly; Auto-GCAS must prevent CFIT over the ocean; the DTM shall not include elevations less than the true terrain elevation in mission areas; and, the DTM accuracy must be sufficient to prevent the vast majority of potential CFIT mishaps.

The present invention was designed to meet all of the above criteria so that it could be employed across multiple aircraft platforms in order to significantly reduce potential aircraft mishaps.

It should be noted that although the invention has been developed to compress data associated with a digital terrain map for auto-GCAS purposes, it may be employed to compress any three dimensional map data for various purposes.

The invention comprises a method to compress and use three dimensional map data in systems that require that said map data be stored in a very small amount of memory. The invention may be employed in an automatic ground collision avoidance system for an aircraft which employs three dimensional digital terrain map data.

The general steps used to practice the invention are as follows. First, boundaries of the three dimensional map data to be compressed are selected. These boundaries can range from a portion of a landmass, such as a portion of the United States all the way to global map data.

The three dimensional map data is then divided into a plurality of regular sized areas. Preferably, for use in an auto-GCAS system, the regular area will be comprised of one degree of longitude by one degree of latitude cells. This specifically relates to the standard cell size employed by the digital terrain map used in most GCAS systems.

Next, a type of free-edged, flat geometric surface is selected that will approximate the terrain in the three dimensional map. In general, this will be a plane that attempts to approximate elevation data over the regular area or a portion of the regular area as discussed further below.

The flat geometric surface is fitted to each of the regular areas on the map, in an attempt to approximate the terrain for each regular area. Each of these approximations will then be checked in order to determine if the approximation falls within selected tolerances for the approximation (which are determined by the user and may be selected by one skilled in the art).

If the terrain approximation using the flat geometric surface falls within the selected tolerances, the compressed data is output as further discussed below.

If the terrain approximation falls outside the selected tolerances, the regular area is evenly divided and the flat geometric surface is used to approximate the terrain in each of the divided portions of the regular area. The tolerance check is then repeated on these new approximations of terrain. This process is recursively repeated until all terrain approximations for the entire three dimensional map fall within tolerances. The flat geometric surface terrain approximations result in a set of compressed data for each regular area that is significantly smaller in size than the original three dimensional map data.

Finally, all of the compressed three dimensional map data is output to files which may be utilized by a computer system, or, preferably, to an automatic ground collision system for an aircraft.

The invention includes a method for decompressing and using the compressed data to determine elevation data for a selected area or specific location on the three dimensional map.

In general, the first step to decompress the data is to determine in which regular area on the three dimensional map a position area of interest resides.

Next, the compressed data associated with the identified regular area is decompressed or decoded to identify the geometric location of each flat geometric surface within a two-dimensional representation of the identified regular area. Finally, the decompressed data is used to output the height associated with the position area of interest to a display.

Now describing the invention in greater detail, the invention uses geometric surfaces or facets arranged in a semi-regular tree structure to compress (lath from a three dimensional map into a very small file size and the ability to quickly decompress the data for use.

Referring to FIG. 1, a flow-diagram that depicts an embodiment of the invention for use in an auto-GCAS system that employs three dimensional DTM is shown. The invention first defines the compression area 100. This user input specifies the boundaries of the compressed DTM selected. Some aircraft will have a need for a DTM which covers the entire world. Other aircraft which may have memory limitations may only require a DTM which spans a single continent. For example, military aircraft may need to be deployed anywhere in the world at a moments notice and may not have the ability to load new DTMs into their systems. Alternatively, small commercial aircraft may only fly US domestic routes and only need the area of the continental US.

Further user input includes the type of flat geometric surface or facet 102 that will be employed to approximate the digital terrain and compress the digital terrain data. The two options for this input are, max thinned and a biased linear regression. The max thinned facet is a facet with constant elevation which is set to the maximum elevation in the area that the facet approximates. The biased linear regression is a facet surface whose surface is sloped by using a linear regression technique to approximate the terrain for the area that the facet will represent. The surface is then biased up so that all of the actual terrain in the facet area is below the facet. Max thinning compression produce datasets which are easier to decompress since no interpolation along the surface is necessary. However, more facets are required to accurately approximate most areas compared to linear regression. Linear regression facets approximate terrain slopes well and require fewer facets per error tolerance; however the decompression time per facet is increased due to a need to interpolate across the facet face.

Another user input is the type of tree structure 104 that will be employed to compress the digital terrain data in association with the type of facet 102 selected. Two preferred options for this input are binary tree and quad tree. Binary treeing allows for two facets to approximate terrain not acceptably represented by a single facet. Quad tree allows for four facets to approximate terrain not acceptably represented by a single facet. Binary tree structure provides about 33% savings in memory usage at the cost of less regularly shaped facets. Quad tree regularity may produce savings in decompression speed for certain hardware implementations.

Yet another user input are global error tolerances 106. This input specifies the allowable error tolerance for areas not defined in a specific error tolerance zone as discussed below. For example, areas of the continental US which are not used for low level flying or landing may have an error tolerance of 1000 feet. 1000 feet would be the global error tolerance.

The user must also input error tolerance zone definitions 108. These input files specify the allowable error tolerance for specific areas. For example, a particular low-level flying route may require the compressed map to be accurate to 100 feet in that area while the map in general may have 1000 foot errors. This low level route should be defined in an Error Tolerance Zone Definition file (.tgl).

The final user input is the actual DTED 110 from the DTM. This type of data is used by the United States Air Force, amongst others, to provide elevation data for systems onboard their high performance fighter aircraft. The DTED database consists of more than 14,000 one degree by one degree cells. Each cell consists of elevation data points at intervals of 1 arc second. Cells with other dimensions and point spacings are also included in the database, but the vast majority, are as stated herein.

The present invention includes several compression processes that modify and or use the input data to employ the invention. The first of these is the regular area division process 112. In this process the DTM is compressed into a plurality of regular areas (areas of the same size). This is done to increase decompression speed by allowing for quick indexing into the compressed data. If the compressed map was completely irregular or semi-regular then the entire map would have to be decompressed at once. Allowing for a regular division allows for a user to choose a regular area and only read and decompress that area. The drawback to this regular division is increased memory usage. So, the regular divisions should be large enough to allow for efficient memory usage and small enough to allow for rapid decompression. Hence, the simplest possible map would be one facet approximating the area of each regular division.

For the present invention, the preferred regular area size is one degree latitude by one degree longitude in size. This regular area size provides the benefit of updating just that area of the map, since DTED comes in 1 degree by 1 degree cells, and not decompressing the entire map.

The next major process is approximating each of the regular areas using the facets 114. Each regular area of terrain data sent to this process module is approximated using either max thinned or linear regression facets. Max thinned approximates the terrain by creating a facet with a constant elevation which is equal to the highest elevation terrain in that area. Linear regression approximates the terrain by performing a linear regression through the data to obtain the slope of the facet and then biases that facet so that no terrain is higher than the approximating facet.

These terrain approximations using the facets are then sent to the tolerance check process module 116. This process receives a facet terrain approximation, which is then compared to the actual terrain data that it is to approximate. If the errors between the two falls outside the user inputted tolerances for a specific regular area, the module sends the area to be further divided in the semi-regular area division process module 118.

The semi-regular area division process module 118 receives input from the tolerance check process module 116 when errors in the terrain approximation fall outside of user inputted tolerance for a specific regular area. When a facet doesn't adequately approximate its area, this process module further divides the regular area into, preferably, four or two regular areas. This creates a tree structure called binary tree or quad tree. Semi-regular divisions allow for low memory usage through the use of their irregularities and fast decompression through the use of their regularities. The flat geometric surface is used to approximate the terrain in each of the divided portions of the regular area. The tolerance check 116 is then repeated on these new approximations of terrain. This process is recursively repeated until all terrain approximations for the entire three dimensional map fall within tolerances.

The outputs 120, 122 of the overall compression process are provided to a computer system, or, preferably, to an automatic ground collision system for an aircraft.

The outputs 120, 122 fall into three categories. The first output category is header information. The header information is used to determine the geographic boundaries of the map, the facet and treeing type used, the size of the regular areas, and the data byte format.

The second output category is table information. The table information is used to index into the data along the regular area boundaries.

The final output category is the actual compressed map data related to the facet approximations and semi-regular divisions of regular areas. The output compressed data is saved in a compressed format for each regular area as further discussed below.

The following is a step by step representation of compressing the data for a software embodiment of the invention using a DTM:

1. The compressed digital terrain map software (hereafter "the software") accepts as an input the region of the world to be compressed.
2. The software begins by looking for the first DTED file in the southwest corner of the input region.
3. If the file exists, skip to step #5.
4. If the file does not exist, the software assumes that the area of the file is over the ocean (since areas completely over the ocean have no DTED files associated with them) and assigns a single facet with a constant elevation of 0 m. Skip to step #10.
5. The software approximates the terrain found in the DTED file with a single facet.

6. The software compares the elevations in the facet approximation with the elevations of the original DTED file.
7. If the differences between the actual data and the approximation is within the user inputted maximum error, Go to step #10.
8. If the differences exceed the user inputted maximum error, the software breaks the area up into either 2 or 4 equal areas (depending on which tree method is used.)
9. The software approximates the new areas each with a facet. Go to step #6.
10. The software writes the information to extract this (these) facet(s) is to the .CDTM file and writes the information of where to find this data into the .CTBL file.
11. The software continues with the next DTED file corresponding to the area directly to the east of the last file. If this file is at the eastern boundary of the map region, the DTED file which is 1 degree north of the current file and to the far west of the map region is selected. If this file is outside the north boundary of the map region skip to step #12. Else skip to step #3.
12. Close files and print BILMAP files for map informational purposes.

The invention further includes a method for decompressing the output or a portion of the output so that elevation information may be output to a display.

To begin the decompression process, a regular area related to an area of interest or a coordinate query is identified and the location of the first data element for the area of interest in the compressed data is found.

Figure 2:
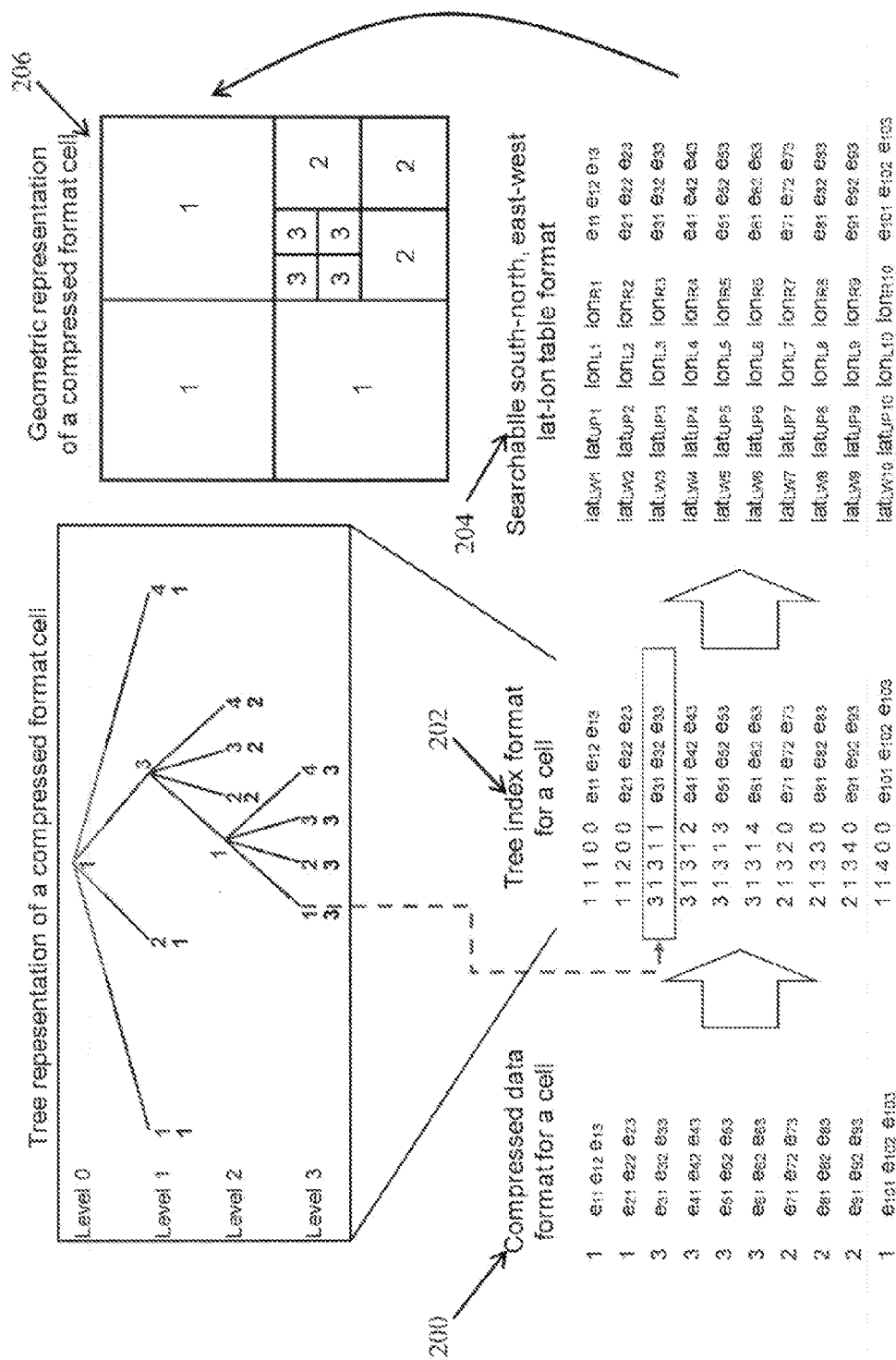
FIG. 2 depicts a diagram of the decompression process of the present invention.

Referring to FIG. 2, a representation of compressed data for a regular area 200, which may be a selected area of interest, is depicted. In this example, the regular area is one cell.

The cell data elements comprise a quad or binary tree level number and three elevation values that define the tile/facet/plane. All the data elements of the cell are read into program memory. The process determines when the last data element of the cell has been read into program memory.

Next, a tree index format for the cell 202 is depicted. Here, each data element from the compressed cell format is converted to four floating point numbers that define the upper and lower latitude, and left and right longitude of each tile/facet/plane associated with each data element. In the compressed data format a tile/facet/plane is identified by the tree level number and the index in a cell.

A tile/facet's exact geometric location within a geometric representation of the cell can however not be determined from its cell index and tree level number alone. That is, the geometric location of a tile/facet is not fully determined by its compressed representation.

The corresponding indices and tree level values of all the compressed data elements preceding the specific compressed data element of interest are necessary for a procedural determination of a specific elements geometric location within a geometric representation of a compressed format cell.

In order to provide the geometric location of each facet within a two-dimensional representation of the cell, the tree index format for the cell is converted into a searchable south-north, east-west format 204. In this step of the process, the data is converted to a compressed format cell of N data elements to an N×4 table of latitude-longitude coordinates representing the south and north latitude, west and east longitude of each tile/facet represented by a data element. The four columns hold the latitudes and longitudes of each tile/facet. Each row is associated with either three elevation values in the case of max thinned compression data or one elevation value in the case of the linear regression compression data.

The compressed data format is essentially read into and converted into the described table format in program memory.

Finally, the south-north, east-west table format data 204 is converted into a two-dimensional geometric representation of the compressed format cell data 206. This is done by determining which tile corresponds to a particular latitude-longitude input query by searching the decompressed cell latitude-longitude table from top to bottom and terminates when the relevant tile is identified.

Another routine uses a located tile's elevation parameters to determine a height associated with the latitude-longitude query on the surface of the selected tile/facet. Using this method, the elevation associated with a latitude-longitude query on a selected two dimensional geometric representation of a cell can be displayed on a computer or terminal as desired.

A user may select data from an entire cell to be display, portions of a cell, tiles, edges of a tile, etc. To minimize time and processing of the data, a user may preferably display data related to the edges of any tiles within a scan pattern of interest along with the edges of the scan pattern itself to determine maximum elevations associated with a scan pattern of interest. To employ the present invention in conjunction with a DTM, the data must be rasterized in the area of interest in order to obtain the elevation data associated with said area of interest.

Referring to FIGS. 3A-3C, rasterized depictions of decompressed cells obtained through slightly different methods are depicted with different scan patterns of interest 300, 302, 304. FIG. 3A shows the algorithmically simplest of decompression methods which involves rasterization of entire facets which correspond to a scan pattern area of interest 300. FIG. 3B depicts another decompression possibility involving only rasterizing specific sections of the facets which are scan patterns of interest 302 at any particular time. This algorithm can be more complex but enable savings in program memory required. FIG. 3C shows an interesting technique that may be employed for an Auto-GCAS system. Since Auto GCAS is concerned with the highest terrain in a particular region, other lower data need not be decompressed. For the present compression method the highest terrain for a particular facet will always occur on the edge of the facet. This allows edge rasterization to fulfill highest point determination requirements and can greatly simplify both algorithms and memory needed for this determination.

Hence, using one of the methods described above, a user may determine elevation information that is displayed via a computer or terminal associated with a selected scan pattern of interest 300, 302, 304. Therefore, a user may obtain elevation data associated with the area of specific tiles 300, the area of regular sections that cross specific tiles 302, the edges associated with tiles 304 or only the edges of the scan pattern of interest 400 that is irregular to the standard tiles to obtain the maximum elevations within the scan pattern of interest because the maximum elevations for a tile within the two-dimensional geometric representation will always fall along the edge of a tile (due to the fact that each tile is represented by a flat, geometric plane).

What is described are specific examples of many possible variations on the same invention and are not intended in a limiting sense. The claimed invention can be practiced using other variations not specifically described above.

What is claimed is:

1. A method for using three dimensional map terrain data in an automatic ground collision avoidance system for an aircraft, comprising the steps of:
   accessing the three dimensional map terrain data on a computer system;
   selecting the boundaries of the three dimensional map terrain data to be compressed;
   dividing the selected boundaries of the three dimensional map terrain data into regular geometric areas;
   defining each regular geometric area with a corresponding free-edged, planar geometric surface;
   approximating the three dimensional map terrain data within each regular geometric area using the planar geometric surface so that each regular geometric area is defined by a an independent planar geometric surface;
   checking the terrain approximation for each regular geometric area to determine if the terrain approximation is within user selected tolerances;
   dividing the regular geometric areas outside the users selected tolerances into smaller regular geometric areas and approximating terrain data as described above for each of the smaller regular geometric areas;
   recursively repeating the checking and dividing the steps until all terrain approximations for regular geometric areas fall within tolerances; and,
   outputting final compressed three dimensional map data to the automatic ground collision system for an aircraft.

2. The method for using three dimensional map terrain data of claim wherein the regular geometric areas comprise one degree by one degree cells.

3. The method for using three dimensional terrain map data of claim 1, wherein the approximating step includes using a method selected from the group of max thinned and biased linear regression.

4. The method for using three dimensional terrain map data of claim 3, wherein the approximation step includes using the method of max thinned and the terrain approximation for each regular geometric area is determined by setting the free-edged planar geometric surface to a constant elevation which is equal to the highest elevation terrain within the regular area.

5. The for using three dimensional map terrain data of claim 3, wherein the approximating step includes using the method of biased linear regression and the terrain approximation for each regular geometric area is determined by performing a linear regression through the digital elevated terrain data to obtain an orientation of each free-edged planar geometric surface and biasing the free-edged planar geometric surface so that no terrain is higher than the free edged planar geometric surface.

6. The method for using three dimensional map terrain data of claim 1, wherein the checking step further comprises:
   selecting global error tolerances for the boundaries of the digital terrain map;
   selecting error tolerances for user specific zones; and,
   checking the terrain approximations for each regular geometric area against the global error tolerances and the error tolerances for specific zones.

7. The method for using three dimensional map terrain data of claim 1, wherein the dividing the type of regular geometric area comprises a recursive division resulting in a tree structure selected from a binary tree or a quad tree.

8. The method for using three dimensional map terrain data of claim 1, wherein the outputting step further comprises outputting:
   header information correlating to the boundaries of the three dimensional terrain map, the type of free edged planar geometric surface defined, the tree structure selected for dividing the regular geometric area, a size of the regular geometric areas, and a data byte format; table information that indexes data along regular geometric area boundaries; and, compressed data.

9. The method for using three dimensional map terrain data of claim 8, further comprising the steps of:
   determining a specific regular geometric area associated with a position area of interest;
   decoding the compressed data associated with the specific regular geometric area to identify the geometric location of each free-edged planar geometric surface within a two-dimensional representation of the specific regular geometric area; and,
   using the decoded data to output the height associated with the position area of interest to a display.

10. The method for using three dimensional map terrain data of claim 9, wherein the decoding step further comprises converting each data element of the compressed data into four floating point numbers that define a location of the boundaries of a square-shaped representation of the free-edged planar geometric surfaces within the specific regular geometric area.

11. The method for using three dimensional map terrain data of claim 10, wherein a size of the square-shaped representations of the free-edged planar geometric surfaces relates to a number of times the free-edged planar geometric surface was divided pursuant to checking the terrain approximation for error tolerances.

12. The method for using three dimensional map terrain data of claim 11, wherein the using the decoded data step further comprises outputting decoded data associated with edges of the position area of interest and all edges of the square-shaped representations of the free-edged planar geometric surface representations within the position area of interest.

* * * * *